Sept. 18, 1951 M. C. SALIT ET AL 2,567,969
MARKING APPARATUS
Filed April 11, 1946 9 Sheets-Sheet 1
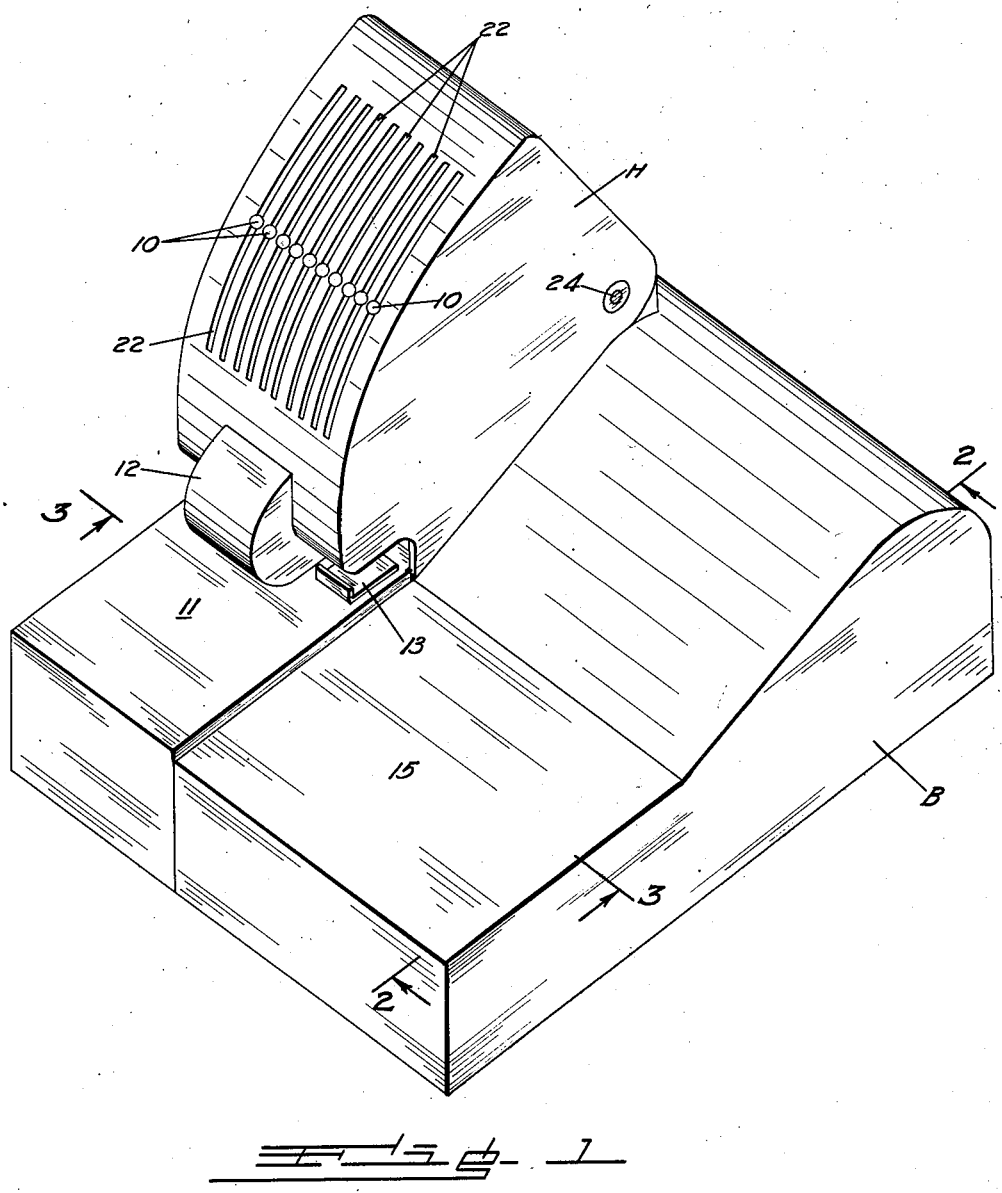
INVENTORS
Myron Charles Salit
and Earl J. Kofford
BY
Horace B. Van Valkenburgh
ATTORNEY Sept. 18, 1951   M. C. SALIT ET AL   2,567,969
MARKING APPARATUS
Filed April 11, 1946   9 Sheets-Sheet 2
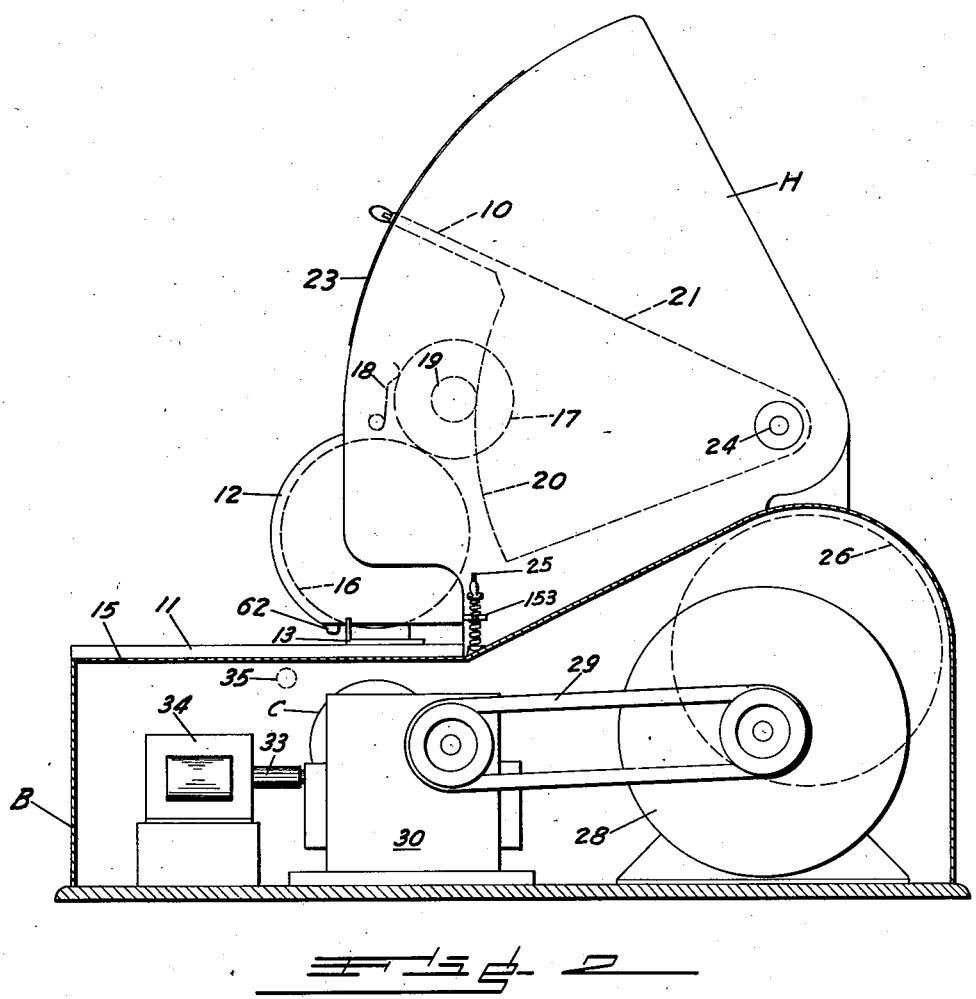
INVENTORS
Myron Charles Salit
and Earl J. Kofford.
BY
Horace B. Van Valkenburgh
ATTORNEY

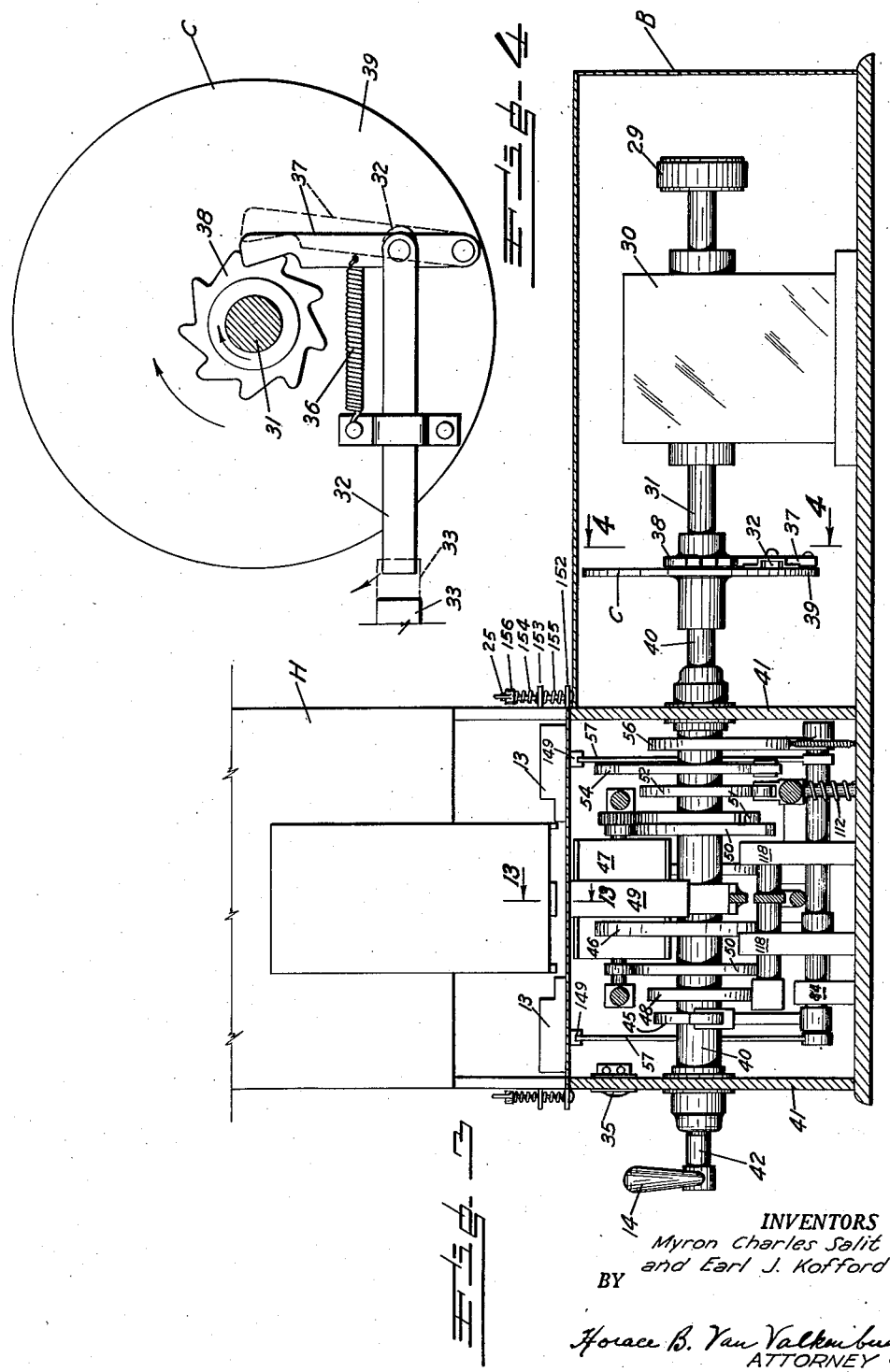

Sept. 18, 1951  M. C. SALIT ET AL  2,567,969
MARKING APPARATUS
Filed April 11, 1946  9 Sheets-Sheet 4
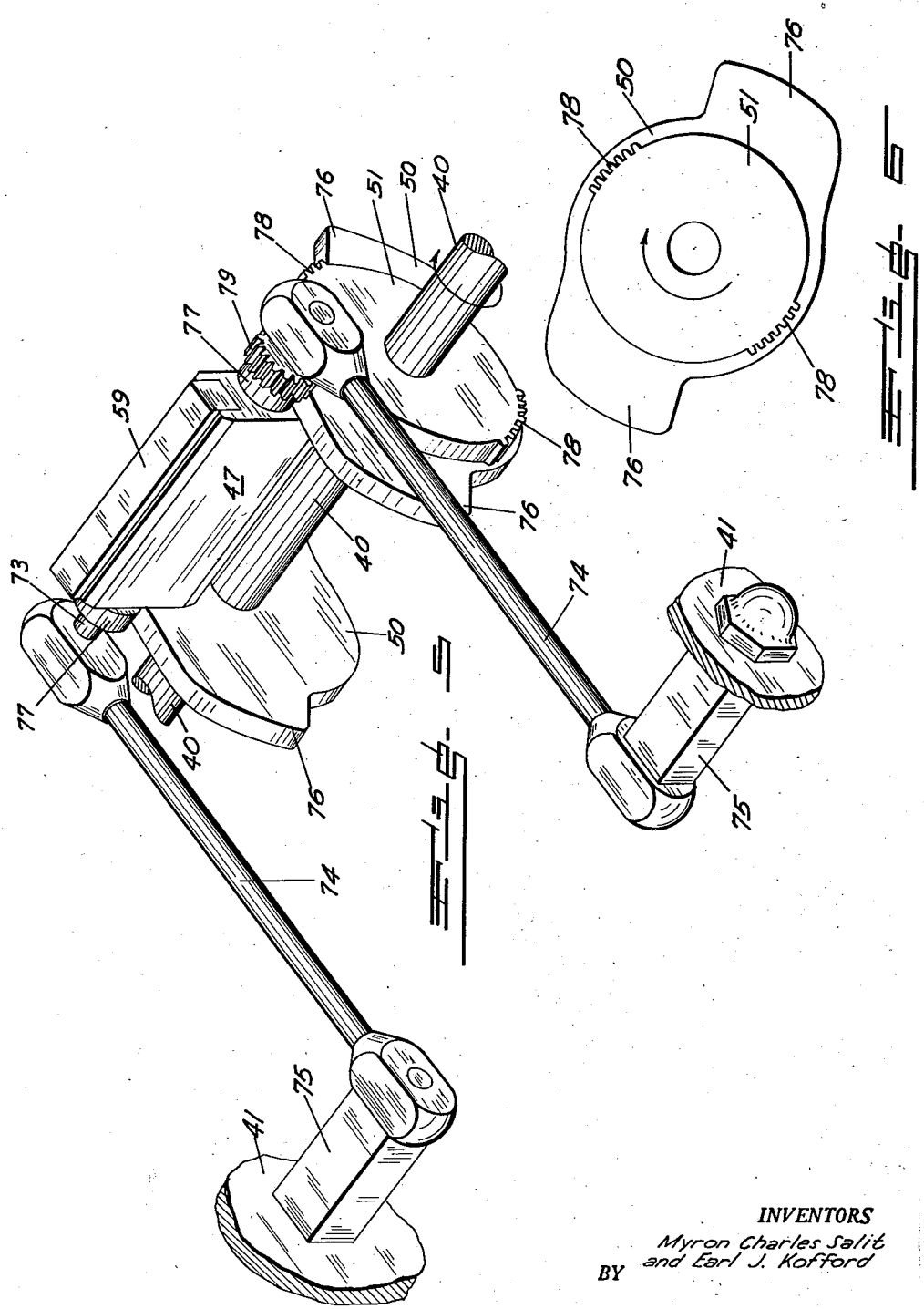
INVENTORS
Myron Charles Salit
and Earl J. Kofford
BY
Horace B. Van Valkenburgh
ATTORNEY Sept. 18, 1951  M. C. SALIT ET AL  2,567,969
MARKING APPARATUS
Filed April 11, 1946  9 Sheets-Sheet 5
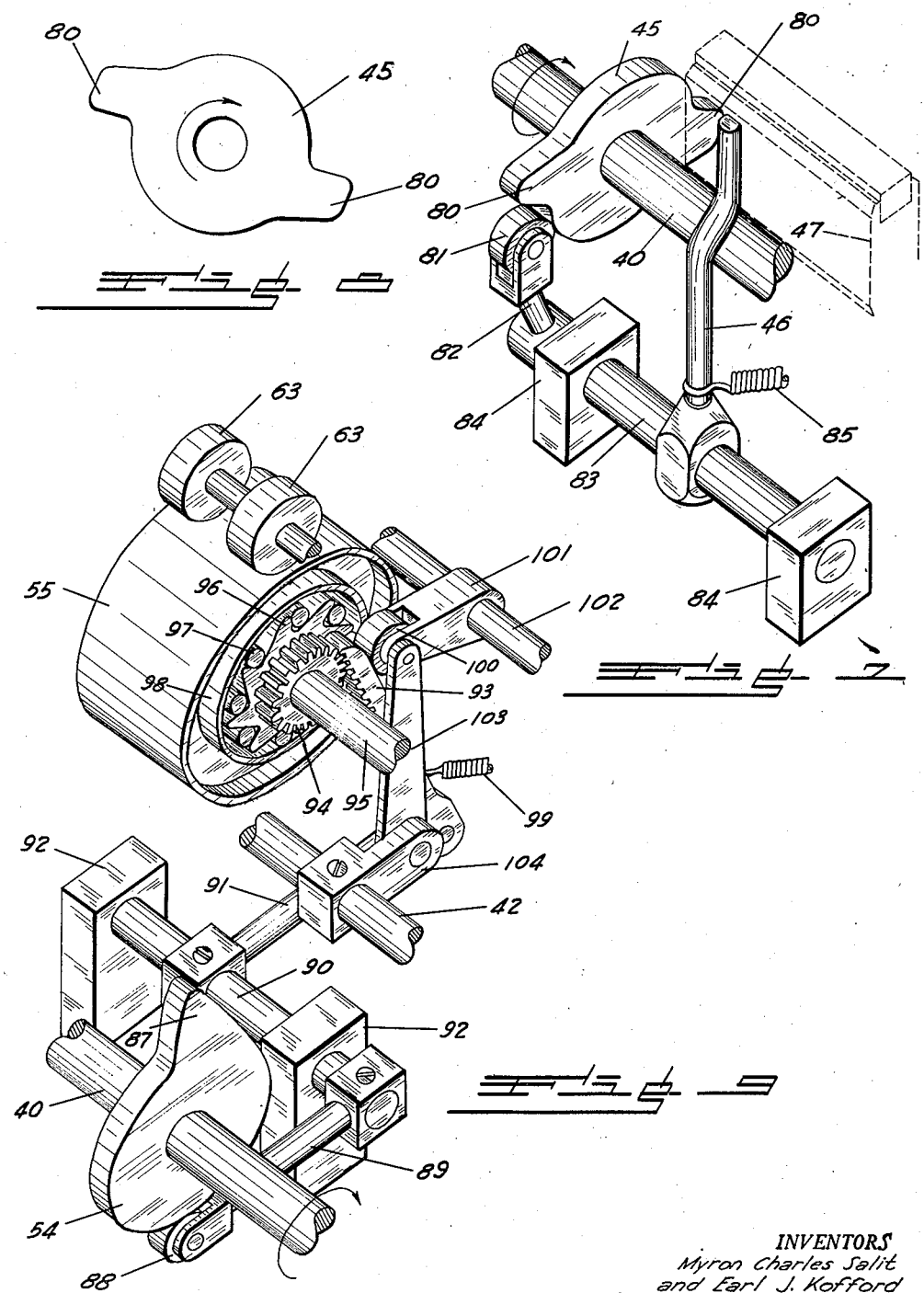
INVENTORS
Myron Charles Salit
and Earl J. Kofford
BY
Horace B. Van Valkenburgh
ATTORNEY Sept. 18, 1951          M. C. SALIT ET AL                    2,567,969
                         MARKING APPARATUS
Filed April 11, 1946                                  9 Sheets-Sheet 6
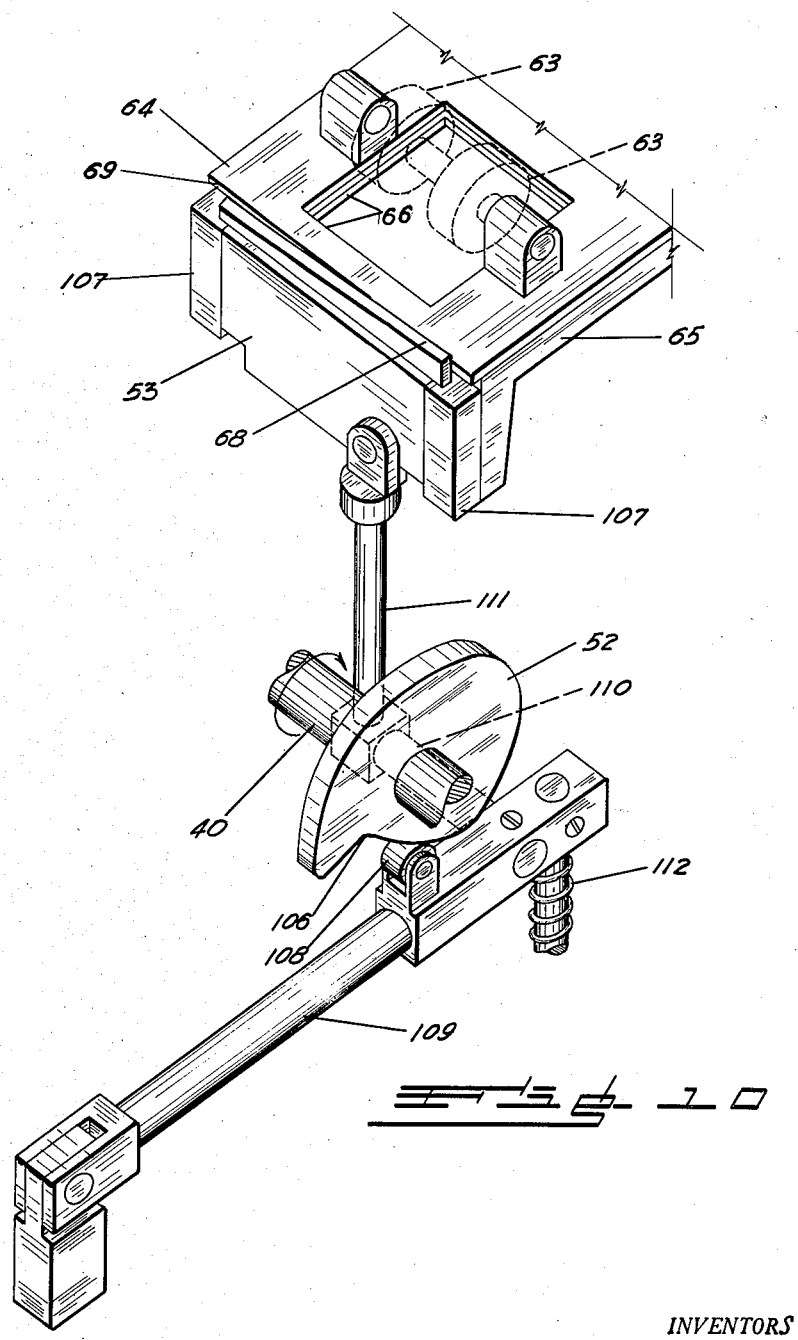
INVENTORS
Myron Charles Salit
BY and Earl J. Kofford
Horace B. Van Valkenburgh
ATTORNEY

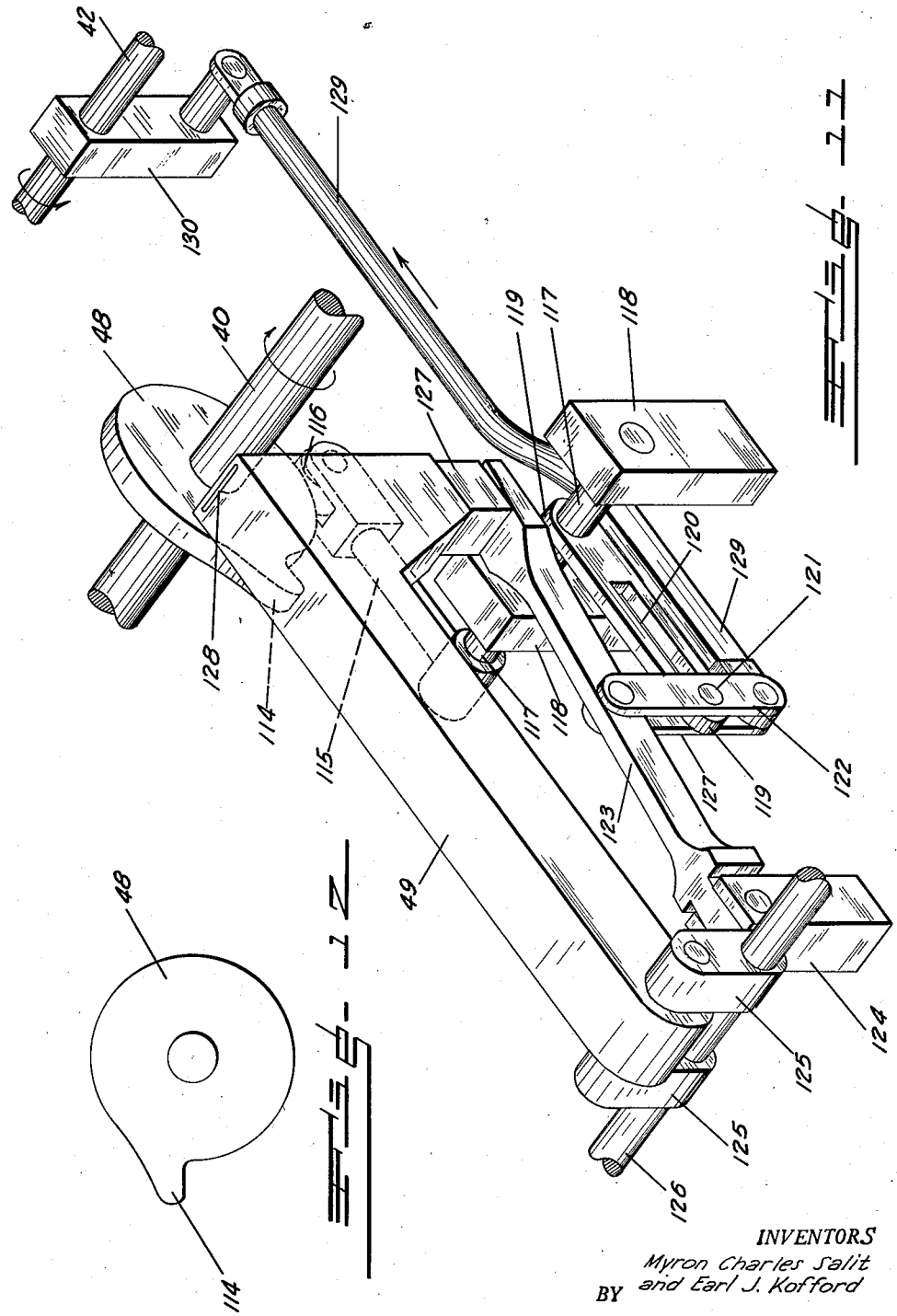

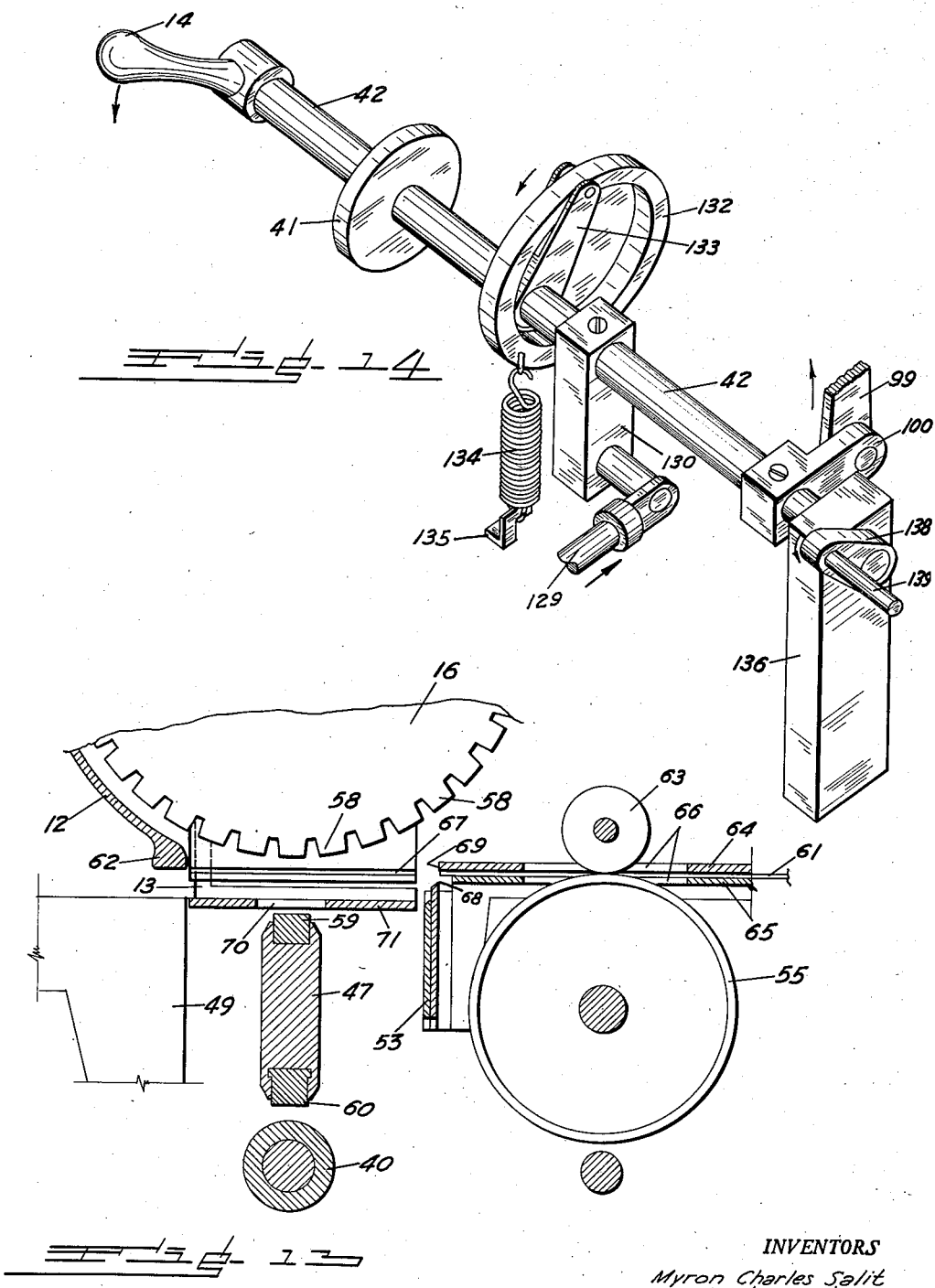

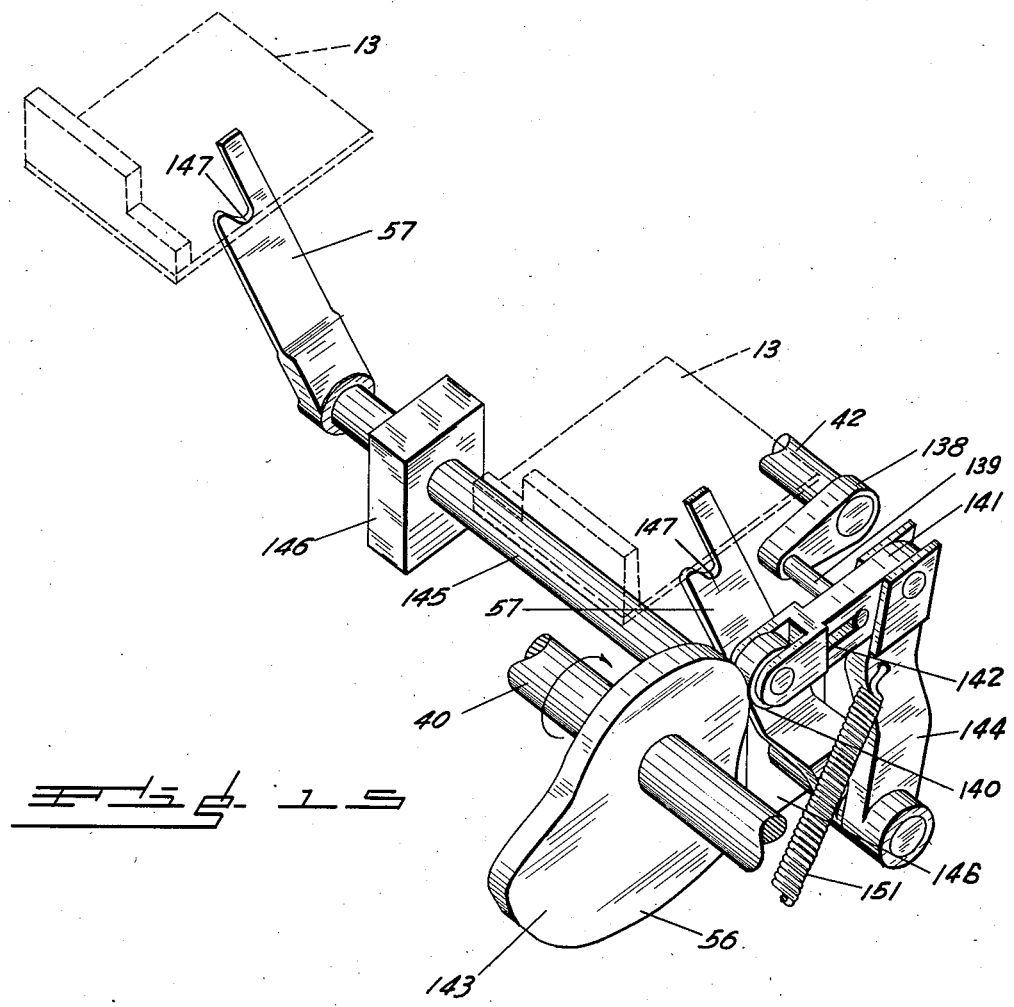

Patented Sept. 18, 1951

2,567,969

UNITED STATES PATENT OFFICE 2,567,969

MARKING APPARATUS

Myron Charles Salit, Denver, Colo., and Earl J. Kofford, Los Angeles, Calif.

Application April 11, 1946, Serial No. 661,398

2 Claims. (Cl. 93—88)

This invention relates to marking apparatus, and more particularly to apparatus for applying indicating marks, as of ownership or the like, to clothing or other articles, as in dry cleaning establishments, laundries, and places of a similar character.

In such establishments, it is necessary to mark each article so that it may be identified and returned to the proper owner, after washing and ironing, dry cleaning, or similar operations. Usually, the identification must withstand the rigors of immersion in hot and cold water, soapy or rinse, in dry cleaning fluid, or the like. A piece of tape on which is printed in indelible ink the identification mark is used frequently in dry cleaning establishments, while in laundries the mark is often printed directly on a portion of the article which will not show during normal wear. However, dark colored ink cannot be used successfully on dark colored clothing, so that again it is found desirable to print the mark on a piece of tape or the like and attach the piece of tape to the article. Some attempts have been made to provide a machine for marking and attaching a piece of tape to an article, as by attaching a numbering machine to a stapling device, but such machines have been an aggregation of otherwise non-related devices, rather than an integrated, smooth-working and flexible machine. Also, such machines required considerable force to operate, were sometimes cumbersome and inconvenient to use, and could not be used optionally to attach to an article a piece of tape carrying the identifying mark, or print the mark directly on the article.

Among the objects of this invention are to provide an improved apparatus for printing identification marks; to provide such apparatus which requires a minimum of effort on the part of an operator; to provide such apparatus which will print an identification mark on a piece of tape and simultaneously attach the piece of tape to an article of clothing or the like; to provide such apparatus which can also be used for printing identification marks directly on an article; to provide such apparatus which will print the same mark on one or any number of articles, or alternatively attach an identically marked piece of tape to any number of articles in succession; to provide such apparatus which will effect only one complete operation when actuated by the operator; to provide such apparatus which will prevent the imprint of an indentification mark upon the article, when a piece of tape having the identification mark is to be attached thereto; to provide such apparatus in which an identifying mark may be printed directly on the article, but in which accidental ink marks or printing of the mark on any but a selected place is prevented; and to provide such apparatus which is quick and effective in operation. Other objects and the novel features of this invention will became apparent from the following description.

Apparatus constructed in accordance with this invention may include printing means, tape feeding means, means for severing the tape to provide a small piece, means for attaching the piece to a desired article, and means for actuating the feeding, printing, severing and attaching means substantially simultaneously. The printing means may include indicia selectively movable to positions providing different combinations of letters and/or numbers; and means for inking such indicia and then pressing a piece of tape or a desired article against such indicia. The apparatus of this invention may also include a guard which normally prevents access to the printing means, i. e. prevents the insertion of an article of clothing or the like into a position in which indicating marks will be printed thereon when a piece of tape provided with such marks is to be attached thereto. The apparatus may further include means for rendering the tape feeding and attaching means inoperative, when the indicating mark is to be printed directly on an article of clothing or the like. Such means also is adapted to render the guard movable just prior to the printing operation, so that the article may be moved into printing position when the mark is to be printed directly thereon. Additional features of this invention are included in the embodiment illustrated in the accompanying drawings, in which:

Fig. 1 is a diametric drawing of apparatus constructed in accordance with this invention;

Fig. 2 is a vertical section taken along line 2—2 of Fig. 1;

Fig. 3 is a vertical section taken along line 3—3 of Fig. 1, through the base of the apparatus;

Fig. 4 is an enlarged vertical section taken along line 4—4 of Fig. 3, illustrating a clutch mechanism for producing one revolution of a cam or actuating shaft;

Fig. 5 is a diametric drawing of an inking and stamping block and associated parts, forming a portion of the printing means;

Fig. 6 is a side view of a cam and intermittent gear, which control movement of the inking and stamping block of Fig. 5;

Fig. 7 is a diametric drawing showing a guide, for the inking and stamping block of Fig. 5, and associated parts;

Fig. 8 is a side view of a cam which actuates the guide of Fig. 7;

Fig. 9 is a diametric drawing of the tape feeding means;

Fig. 10 is a diametric drawing of the tape severing means;

Fig. 11 is a diametric drawing of the tape attaching means;

Fig. 12 is a side view of a cam which actuates the tape attaching means of Fig. 11;

Fig. 13 is a fragmentary vertical section, taken along line 13—13 of Fig. 3, showing a tape guide leading from the tape feeding means, and illustrating operation of the tape severing means and tape attaching means;

Fig. 14 is a diametric drawing illustrating actuating means for a guard for articles of clothing and the like; and Fig. 15 is a diametric drawing illustrating a throwout lever system for rendering the tape attaching and feeding means inoperative and the guard actuating means of Fig. 14 operative, when the indicating mark is to be printed directly on an article of clothing or the like.

As illustrated in Fig. 1, apparatus constructed in accordance with this invention may include a housing H which encloses suitable indicia means and which is mounted at one side atop a base B in which is installed the principal operating parts and mechanism. To mark an article of clothing or the like, levers 10 are shifted to positions setting the indicia means in housing H to produce the desired mark, and an appropriate portion of an article of clothing or the like is placed on an operating space 11 in front of housing H, then moved beneath a type wheel housing 12 for attachment of a piece of tape carrying the desired identification mark. A pair of guards 13, one at each side of and below housing 12, as in Fig. 3, prevent the article from being moved back to the printing means, when a printed piece of tape is to be attached thereto, but when the mark is to be printed directly on the article, the guards are moved rearwardly after a lever 14 is thrown to the down position, to permit insertion of the article further into the apparatus. Base B also provides a work space 15 on which the operator may place order sheets or the like, for making notations during use of the apparatus.

The indicia means enclosed within housing H is conventional, being shown in outline in Fig. 2. The indicia means includes a series of rotatable type wheels 16 provided with raised teeth around the periphery thereof, each tooth carrying a letter or numeral, or other character. Any desired number of type wheels may be provided, such as ten, to provide various combinations of letters and numerals which will produce the desired indicating mark, which is printed by the lowermost characters of the type wheels. Each type wheel is movable by an intermediate gear 17, provided with teeth which mesh with the teeth of the type wheel, to a position in which the desired letter or numeral for each type wheel will be at the lowermost point of the wheel, a spring 18 for each intermediate gear, or other suitable means, being provided to hold each type wheel in the set position. Each intermediate gear 17 is in turn attached to, or formed integrally with, a pinion 19 having teeth adapted to mesh with the teeth of a curved rack 20 attached to, or formed integrally with, a quadrant 21. There is one quadrant 21, one pinion 19, and one intermediate gear 17 for each type wheel 16, and each lever 10 is formed integrally with, or attached to, a quadrant 21.

Levers 10 move in slots 22 in housing H, as in Fig. 1, while a strip 23, of Fig. 2, may be attached to housing H alongside each slot 22, the strips being provided with marks the same as the characters on the teeth of type wheels 16, so that each lever 10 may be set in a position alongside the character on the strip which is the letter or numeral to be placed lowermost on the corresponding type wheel 16. Quadrants 21 are pivoted at their rear ends on a shaft 24, on which housing H is also pivoted. Housing H is movable upwardly and downwardly by adjusting screws 25, to regulate the elevation of type wheels 16. A feed roll 26 of tape is mounted in base B beneath the rear of housing H, access for replenishing the tape roll being obtained by lifting housing H.

The mechanism installed in base B, as in Figs. 2 and 3, includes a motor 28 connected by a belt 29 with a speed reducer 30, which in turn is directly connected to a clutch C by a drive shaft 31. Clutch C is normally disengaged, a lever 32 thereof being held in disengaging position when plunger 33 of a solenoid 34 is in the extended position of Fig. 2. To initiate a marking operation, the operator presses a push-button, contact switch 35, mounted on the side of base B in a convenient position, as in Fig. 3. Switch 35 is in series with solenoid 34, and when the solenoid is energized, the plunger 33 thereof is withdrawn, as in Fig. 4, moving from the dotted to the full position of Fig. 4. This permits a spring 36 to move lever 32 and a latch 37 from the dotted to the full positions of Fig. 4, whereupon latch 37 engages a ratchet pinion 38, mounted on drive shaft 31 and rotating therewith. Preferably, motor 28, and consequently also ratchet pinion 38, rotates continuously, so that immediate operation is assured whenever switch 35 is closed. Lever 32, latch 37, and spring 36 are mounted on a clutch plate 39 and rotate therewith.

When latch 37 engages ratchet pinion 38, the clutch C is turned through one revolution, rotating a cam shaft 40 driven from clutch plate 39. Clutch C and cam shaft 40 are rotated through only one revolution, during which the characters at the lowermost points on type wheels 16 are inked, a predetermined length of tape is fed from roll 26 of Fig. 2, and the end section or piece of tape is simultaneously printed, attached to the article and cut off, in a manner explained hereinafter. Shaft 31 and clutch C may be rotated at about 16 R. P. M., so that each revolution of cam shaft 40 requires about 3¾ seconds.

As clutch C completes one revolution, the operator in the meantime having removed the pressure against switch 35, to open the solenoid circuit and cause plunger 33 thereof to resume its extended position, the dotted position of Fig. 4, lever 32 will strike plunger 33 and cause latch 37 to disengage from ratchet pinion 38, thereby stopping the cam shaft 40. The apparatus is then ready for the next operation, which may be made as soon as the operator removes the marked article and inserts the next article to be marked, changing the setting of type wheels 16 in the manner previously described, if necessary. If desired, a suitable relay may be associated with solenoid 34 to open the circuit thereto shortly after plunger 33 is withdrawn and lever 32 has had opportunity to rotate past the position of the plunger, so that the plunger will stop the clutch after one revolution, even though the operator continues pressure against switch 35.

Cam shaft 40 is journaled in suitable bearings carried by bearing walls 41 of base B, a throwout shaft 42 being similarly journaled at the end adjacent lever 14, to the rear of cam shaft 40. Lever 14 is, of course, attached to throwout shaft 42, and is moved from the upper position shown in Fig. 3 to a down position when the indicating mark is to be printed directly on the article, effecting results described in detail later. Lever 14 and throwout shaft 42 are conveniently mounted in a non-interfering position, such as rearwardly of guards 13, and switch 35 may be disposed directly above the bearing for cam shaft 40.

The cams mounted on cam shaft 40, reading from left to right in Fig. 3, include a cam 45, also shown in Figs. 7 and 8, for actuating a guide 46 for an inking and stamping block 47; a cam 48, also shown in Figs. 11 and 12, for actuating the means for attaching a piece of tape to the article, which may include a stapler 49; a pair of cams 50 and an intermittent gear 51, also shown in Figs. 5 and 6, for actuating the printing means, which include inking and stamping block 47; a cam 52, also shown in Fig. 10, for actuating the tape severing means, which includes a knife 53 of Fig. 10; a cam 54, also shown in Fig. 9, for actuating the tape feed means, which includes a roller 55 of Fig. 9; and a cam 56, also shown in Fig. 15, for actuating guards 13 through arms 57, when throwout lever 14 is moved to the down position and thereby rotates throwout shaft 42 from the position of Fig. 14 to the position of Fig. 15. Referring to Fig. 13, the above cams are so shaped and positioned on cam shaft 40, that the type characters on lowermost teeth 58 on type wheels 16 are first inked by an inking pad 59 mounted on one edge of block 47 and preferably formed of a suitable fibrous material saturated with, and adapted to retain for a considerable period, a supply of a suitable marking ink. As cam shaft 40 turns further, block 47 is moved downwardly and turned over, so that on the next upward movement, a stamping pad 60, preferably formed of hard rubber or the like, mounted in a groove on the opposite edge of block 47, will press the tape against the inked type characters and cause the desired indicating mark to be printed thereon.

In the meantime, roller 55 is turned a predetermined distance to move a desired amount of tape 61 forwardly beneath the type wheels, and preferably so that the end of the tape comes under an abutment 62 formed at the lower end of type wheel housing 12. For feeding, the tape is pressed against roller 55 by a pair of idler rollers 63, shown also in Fig. 9, the tape moving through upper and lower guides 64 and 65, each provided with a slot 66 to accommodate rollers 55 and 63, which are preferably narrower than the tape. During movement of the tape beneath the type wheels, the edges of the tape pass along slotted guides 67, which are fastened to the sides of type wheel housing 12 at either side of the type wheels, and thereby outside the scope of movement of block 47. As will be evident, only the outer edges of the tape are engaged by the slots in each guide 67, but this is sufficient to position the tape directly beneath, and close to, the type wheels, and also to position the end of the tape directly beneath abutment 62.

Thereafter, the stamping pad 60 is moved into engagement with the tape, and knife 53 and stapler 49 are preferably simultaneously moved upwardly, knife 53 severing the tape by the shearing action of a sharp upper edge 68 of the knife 53 moving across the end 69 of upper guide 64, as in Fig. 10. At the same time, stapler 49 pushes a staple through the article of clothing or the like and on through the tape, the portion of the article to which a piece of tape is to be attached having previously been inserted beneath abutment 62 and further movement of the article toward the inked type wheels having been prevented by guards 13. Abutment 62 is provided with conventional slots for closing the staple, and stamping pad 60 moves upwardly through a slot 70 in a section 71 of the top of base B. The top of stapler 49 also conveniently forms a portion of the top of base B.

The operation of the printing means will be best understood from Figs. 5 and 6, wherein inking and stamping block 47 is mounted on a shaft 73 journaled at the ends of a pair of supporting arms 74, which, in turn, are pivotally mounted at their opposite ends on blocks 75, attached to bearing walls 41. Each cam 50 is provided with two extending portions 76 oppositely disposed so that, through engagement with rollers 77 mounted on shaft 73 at either side of block 47, the block 47 will be moved upwardly and downwardly two times during each revolution of cam shaft 40. Intermittent gear 51 is provided with two sets of teeth 78 so that, during the time that the block 47 is in a lower position, teeth 78 will engage a pinion 79, also mounted on shaft 73, and turn the block over. Thus, starting with the position shown in Fig. 5, as one extending portion 76 of each cam 50 moves block 47 upwardly, inking pad 59 will engage and ink the desired type characters. As soon as rollers 77 drop off the first extending portions 76 of cams 50, further rotation of cam shaft 40 will cause the first set of teeth 78 to engage pinion 79 and rotate block 47 through 180°, thus placing the stamping pad 60 uppermost. Continued rotation of cam shaft 40 causes the block 47 to be moved upwardly, through engagement of rollers 77 with the second extending portions 76 of cams 50, thereby pressing stamping pad 60 against the tape and causing the desired indicating mark to be printed. Further rotation of cam shaft 40 causes the rollers 77 to drop off the second extending portions 76, and the second set of teeth 78 on intermittent gear 51 to engage pinion 79, thereby turning block 47 through another 180° and again placing inking pad 59 uppermost. Cam shaft 40 will have then completed one revolution, at which time it stops, and inking and stamping pad 47 will be in position for the next operation.

The operation of the guiding means is best understood from Figs. 7 and 8, guide 46 holding block 47 in vertical position during upward and downward movement of the latter, but cam 45 is provided with a pair of extending portions 80, which coincide angularly with the teeth 78 of intermittent gear 51 of Figs. 5 and 6, so that guide 46 will be moved away from block 47 while the latter is being turned over. For this purpose, extending portions 80 of cam 45 at the appropriate times engage a roller 81 mounted at the end of a lever arm 82, the latter being attached to a shaft 83 to which guide 46 is attached and which is pivotally mounted in blocks 84. Also, guide 46 is held firmly against block 47 during upward and downward movement of the latter by a spring 85, one end of which may be attached to guide 46 and the other end of which may be attached to the bottom plate of base B.

The operation of the tape feeding means is best understood from Fig. 9, feed roller 55 being actuated through cam 54 when an extending portion 87 of cam 54 engages a roller 88, mounted on the end of a lever arm 89, in turn attached to a shaft 90. A second lever arm 91, extending in the opposite direction, is also attached to shaft 90, which is pivotally mounted in blocks 92, while a rack 93 is pivoted on the outer end of lever arm 91. The teeth of rack 93 engage the teeth of a pinion 94 mounted on a shaft 95, on which roller 55 is also mounted, so that upward movement of rack 93, due to depression of roller 88 by extending portion 87 of cam 54, will turn roller 55 through a predetermined angular distance, necessary to move the tape forwardly the desired amount. A directional clutch is provided by a star wheel 96 mounted on shaft 95, and having teeth shaped so as to press rollers 97 out against a drum 98 when star wheel 96 is rotated in a counter clockwise direction, but permits rollers 97 to drop into the valleys between the teeth and thereby prevent backward rotation of feed roller 55, when rack 93 moves back down to its lower position as cam roller 88 drops off extending portion 87 of cam 54. Cam 54 is positioned angularly on shaft 40 so that feed roller 55 will be actuated as block 47 of Fig. 13 is moving downwardly after inking so that the tape will be in position for printing by the time block 47 reaches an upper position again.

Rack 93 is normally held in engagement with pinion 94, against the pull of a spring 99, by a roller 100 mounted on an arm 101, the latter being attached to a pivotally mounted shaft 102. Arm 101 is also pivotally attached at its outer end to the upper end of a link 103, the latter being pivotally attached at its lower end to a lever 104 mounted on throwout shaft 42. When the throwout shaft is moved in a counter clockwise direction, by movement of throwout lever 14 of Fig. 14 to the down position, link 103 will move roller 100 upwardly and outwardly, as evident from Fig. 9. At the same time, spring 99 will pull rack 93 outwardly and away from pinion 94 and hold the rack against roller 100, so that when cam shaft 40 rotates, the feed roller 55 will not be actuated. The tape feeding means is, of course, placed in this position only when the indicating mark is to be printed directly on the article.

The operation of the tape covering means will be understood more clearly from Fig. 10, cam 52 for actuating knife 53 having a single depression 106 and knife 53, during upward and downward movement, moving in a pair of guides 107, of suitable construction and disposed at each end of the knife. Cam 52 engages a roller 108 mounted near the outer end of a pivoted lever 109, in turn connected by a bar 110 with the lower end of a knife actuating rod 111, while a compression spring 112 normally urges lever 109 upwardly. As cam 52 is turned by cam shaft 40, the knife 53 is maintained in its lower position, as in Fig. 13, around a greater portion of the periphery of cam 52. This maintains spring 112 compressed, but when depression 106 of cam 52 reaches roller 108, lever 109 is moved upwardly, and along with it knife 53, as to the position shown in Fig. 10. The tape is severed by the shearing action of sharp upper edge 68 of knife 53 across end 69 of upper guide 64, as described previously. When cam shaft 40 and cam 52 rotate further, roller 108 rides out of depression 106, lever 109 is depressed against spring 113, and knife 53 is returned to its lower position, as in Fig. 13. Also, knife 53 remains in the lower position until time for another severing operation is reached. When the throwout lever 14 of Fig. 14 is turned down, for direct printing on the article, the movement of knife 53 continues as before, but no tape will be cut, since none is being fed by the tape feeding means of Fig. 9.

The operation of the tape attaching means will be best understood from Figs. 11 and 12, stapler 49 being actuated by cam 48 once during each revolution of cam shaft 40, when extending portion 114 of cam 48 depresses a lever 115. The periphery of cam 48 engages a roller 116 mounted on the outer end of lever 115, which is attached to a shaft 117, pivoted in blocks 118 and having attached thereto an actuating lever 119 provided with a central slot 120. Normally, a link pin 121, attached between link plates 122, transmits upward movement of actuating lever 119 through link plates 122 to a stapler lever 123. Stapler lever 123 is pivoted at its rear end on a block 124, while the upper ends of link plates 122 are pivotally attached to stapler lever 123 at about the center of the latter. Stapler 49 is pivoted at its rear end on links 125, in turn pivoted on a pin 126, and the forward end of stapler lever 123 engages a head 127 at the forward end of stapler 49. In the position shown, whenever the extending portion 114 of cam 48 reaches roller 116, the stapler 49 will be moved upwardly slightly, into engagement with the article, and head 127 will be moved upwardly to push a staple through a conventional slot 128 in the upper end of the stapler. The staple is pushed through the article and tape, and is closed by the conventional slots provided in the lower side of abutment 62 of Fig. 13, as indicated previously.

When the indicating mark is to be printed directly on the article, the tape attaching means is rendered inoperative by movement of throwout shaft 42 in the direction of the arrow of Fig. 11, thereby moving a link rod 129 in the direction of the arrow, so as to shift the position of link pin 121 in slot 120 to a point nearer shaft 117. This reduces the effective length of actuating lever 119 and causes insufficient motion to be imparted to stapler lever 123 to actuate stapler 49. Link rod 129 is pivotally attached at one end to the lower end of link plates 122, and at its opposite end to a block 130, in turn mounted on throwout shaft 42.

The action of the throwout mechanism will be more fully understood from Fig. 14, shaft 42 being provided with a snap or biasing action arrangement for maintaining it in a position with throwout lever 14 either up or down. Such snap action arrangement includes a ring 132, a lever 133 attached to throwout shaft 42 and also pivoted on ring 132, and a spring 134 always exerting a downward pull on ring 132, spring 134 being attached at its upper end to ring 132 and at its lower end to a bracket 135 attached to base B. Shaft 42 may be journaled adjacent one end in wall 41, as indicated previously, and also may be journaled at its opposite end in a block 136, as in Fig. 14. With throwout lever 14 and shaft 42 in the position of Fig. 14, lever 133 is inclined and on one side of the line of pull of spring 134, so that the ring 132 and shaft 42 are maintained in that position. When throwout lever 14 is moved in the direction of the arrow of Fig. 14, lever 133 is moved past center to the opposite side of the line of action of spring 134, and then maintained in that position by spring 134. Thus, to whatever position throwout lever 14 is moved, the throwout lever and shaft 42 will remain in that position until lever 14 is again shifted.

The throwout mechanism is also provided with a crank 138 and a crank pin 139, as in Figs. 14 and 15, for shifting the guard moving mechanism of Fig. 15 to a position for producing the desired movement of guards 13, when the indicating mark is to be printed directly on the article. Crank 138, in the position of Fig. 14, normally prevents cam 56 of Fig. 15 from actuating the guard moving arms 57, by holding a roller 140 away from cam 56. This is effected by holding a lever 141, on the end of which roller 140 is mounted, upwardly through engagement of crank pin 139 with a slot 142 in lever 141. When the throwout lever 14 is moved downwardly to rotate throwout shaft 42 and move crank pin 139 downwardly, lever 141 also moves downwardly, to the position of Fig. 15, so that roller 140 will engage the periphery of cam 56. When an extending portion 143 of cam 56 reaches roller 140, the guards 13 will be moved inwardly, through movement transmitted from lever 141 through a link 144 to a pin 145 pivoted in blocks 146. The upper end of link 144 is pivotally attached to lever 141, while link 144 and arms 57 are attached at their lower ends to pin 145. Each guard 13 is provided with a flange 149, as in Fig. 3, engaged by a fork 147 formed at the upper end of each arm 57, as in Fig. 15. Also, a spring 151 is attached to link 144, as in Fig. 15, to hold the guards 13 in front position until moved rearwardly at the proper time by cam 56. Spring 151 also holds roller 140 against cam 56 during operation, i. e., when in the position of Fig. 15.

Cam 56 is positioned on shaft 40 with extending portion 143 in a radial position such that the guards 13 will be moved inwardly, either as inking and stamping block 47, of Figs. 5 and 13, is moving downwardly, after the type characters on the lowermost teeth 58 of type wheels 16 have been inked, or as block 47 is being turned over to place the stamping pad 60 uppermost. The guards 13 are thus adapted to prevent the article from contacting the inking pad 59 or interfering in any way with its operation. For all operations, the article may merely be placed against the guards 13. When a marked piece of tape is to be attached to the article, that portion of the article to which the piece of tape is to be attached is placed beneath abutment 62 of Fig. 13, and when the mark is to be printed directly on the article, that portion of the article on which the mark is to be printed is placed uppermost and between the guards.

For the latter operation, throwout lever 14 having been moved to the down position, the starting switch 35 of Fig. 3 is then closed, whereupon the apparatus is actuated to cause the type characters to be inked. The article may be moved inwardly with the guards 13, as the extending portion 143 of cam 56 comes around to roller 140, the tape feeding and attaching means being inoperative, as described previously. After the stamping block 60 has caused the desired mark to be printed on the article, the guards 13 move the article back from beneath the type wheels, and the article is then readily removed by the operator, for insertion of and printing of the identification mark on the next article, the type wheels being set to different positions if the next mark is different from the previous mark. When it is desired to resume operations in which the mark is printed on the tape and a piece of tape attached to the article, it is necessary only to move lever 14 upwardly, whereupon the various parts are in position to perform such operations.

The tape feeding means, as in Fig. 13, will feed the tape until the terminal end thereof has passed roller 55, so that only a very small piece of tape is wasted. When the tape of a roll 26 of Fig. 2 is exhausted, and it is desired to place a new roll of tape in the apparatus, the housing H is swung upwardly and rearwardly, thus providing ready access to the tape roll position. When the new roll of tape is placed in the apparatus, the end of the tape is merely inserted between guides 64 and 65, and idler rollers 63 rotated by hand until the end of the tape appears at the end 69 of upper guide 64.

Adjusting screw 25 for housing H may bear against a flange or the surface of base B, at each side of the housing H, or may be provided with cooperating resilient means, as in Figs. 2 and 3, to cause housing H to float, as it were, in any desired adjusted position. Thus, the head of each screw 25 may be disposed beneath a suitable support, such as a flange 152 attached to base B. The adjusting screw 25 preferably extends through a hole sufficiently large to permit a pivotal movement of the screw, so that the screw may be swung out of a slot in an upper flange 153 attached to housing H. An upper spring 154 and a lower spring 155 may be provided for each adjusting screw, lower spring 155 bearing between flanges 152 and 153, and upper spring 154 bearing between flange 153 and a wing nut 156, by which the pressure of the springs and the vertical position of the housing is adjusted. It will be evident, of course, that other suitable adjusting means for the housing H may be utilized.

From the foregoing, it will be apparent that the apparatus of this invention fulfills to a marked degree the objects and requirements hereinbefore set forth. The combination of printing means, tape feeding means, tape severing means, and tape attaching means, with means for actuating the same so as to perform only one operation and then stop, is a valuable contribution of this invention. Also, the combination of tape feeding means, tape severing means, and means for printing an indicating mark on the severed piece of tape, and simultaneously attaching the piece of tape to an article of clothing or the like, constitutes another valuable contribution. A pivotally mounted housing carrying the indicia means, which may be tipped upwardly to provide access to the tape roll, further enhances the usefulness of the apparatus. The movable guards which remain in fixed position during the printing of an indicating mark upon a piece of tape which is attached to the article and thereby prevent the article from contacting the inking means or type wheels, but are movable to permit the article to be positioned beneath the type wheels at the proper time when the mark is to be printed directly on the article, constitute a further valuable improvement. As will be evident, the specific construction disclosed is illustrative only, and it will be understood that numerous changes are possible without altering either the function of the various parts or the mode of operation of the apparatus.

It will further be understood that other embodiments may exist and additional changes may be made, all without departing from the spirit and scope of this invention.

What is claimed is:

1. An apparatus of the class described having a base portion supporting a main housing and an auxiliary housing, the top surface of said base portion providing a working space for articles to be marked with indicia, a tape feed roll located within the base portion below the main housing, tape feeding mechanism within the base portion for supplying a piece of tape to the working space, a plurality of type wheels having peripherally arranged type located within the auxiliary housing above said working space, indicia printing mechanism disposed within the base portion below the type wheels and comprising an inking and stamping block having disposed in its opposite sides and inking pad and a stamping pad, associated driving and driven shafts and intermittent gear means cooperating therewith for shifting the inking pad and the stamping pad alternately into engagement with the pre-located type wheel indicia and the piece of tape whereby to cause said tape to be imprinted, type selector mechanism located within the main housing and operatively connected with the type wheels disposed within the auxiliary housing, said type selector mechanism including finger pieces disposed exteriorally of the main housing for easy access by an operator, a stapling mechanism also disposed within the base portion of the apparatus for applying the pre-selected and marked piece of tape to the article, and a pair of movable guard members disposed at opposite sides of the auxiliary housing and adjacent the working space for normally preventing an article to be marked from reaching the printing mechanism.

2. Structure according to claim 1 wherein manually operable throwout mechanism also disposed within the base portion of the apparatus and having an externally positioned hand lever is provided for shifting the pair of guard members to their inoperative positions whereby to permit printing of an indicating mark directly on the article to be marked for identification.

MYRON CHARLES SALIT.
EARL J. KOFFORD.

REFERENCES CITED

The following references are of record in the file of this patent:

UNITED STATES PATENTS

| Number | Name | Date |
|---|---|---|
| 864,157 | Davis | Aug. 27, 1907 |
| 884,337 | Kienast | Apr. 7, 1908 |
| 960,206 | Silverstein | May 31, 1910 |
| 1,048,136 | Davis | Dec. 24, 1912 |
| 1,710,551 | Rawson | Apr. 23, 1929 |
| 1,969,898 | Mortimer | Aug. 14, 1934 |
| 2,006,040 | Crane | June 25, 1935 |